United States Patent
Johnson et al.

(10) Patent No.: US 9,982,322 B2
(45) Date of Patent: May 29, 2018

(54) SOLVENT-FREE SYNTHESES OF SILVER PRODUCTS PRODUCED THEREBY

(71) Applicant: CORNING INCORPORATED, Corning, NY (US)

(72) Inventors: Benedict Yorke Johnson, Horseheads, NY (US); Samuel Odei Owusu, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 506 days.

(21) Appl. No.: 14/423,870

(22) PCT Filed: Aug. 29, 2013

(86) PCT No.: PCT/US2013/057237
§ 371 (c)(1),
(2) Date: Feb. 25, 2015

(87) PCT Pub. No.: WO2014/036228
PCT Pub. Date: Mar. 6, 2014

(65) Prior Publication Data
US 2015/0307961 A1    Oct. 29, 2015

Related U.S. Application Data

(60) Provisional application No. 61/695,055, filed on Aug. 30, 2012.

(51) Int. Cl.
| | |
|---|---|
| *C22B 11/00* | (2006.01) |
| *C22B 11/02* | (2006.01) |
| *B22F 1/00* | (2006.01) |
| *C22C 5/06* | (2006.01) |
| *B22F 9/20* | (2006.01) |
| *B82Y 30/00* | (2011.01) |

(52) U.S. Cl.
CPC ............ *C22B 11/02* (2013.01); *B22F 1/0018* (2013.01); *B22F 9/20* (2013.01); *B82Y 30/00* (2013.01); *C22C 5/06* (2013.01)

(58) Field of Classification Search
CPC .................. B22F 1/0003; C22B 11/02–11/028
USPC .......... 75/747, 710, 634–636; 977/777, 904; 424/618; 516/78; 106/1.19; 420/501
See application file for complete search history.

(56) References Cited

U.S. PATENT DOCUMENTS

| | | | |
|---|---|---|---|
| 2,005,018 A | 6/1935 | West et al. | |
| 3,334,995 A | 8/1967 | Gaspar | |
| 3,649,250 A | 3/1972 | Dorenfeld et al. | |
| 4,039,327 A | 8/1977 | Dietz, Jr. et al. | |
| 4,078,918 A | 3/1978 | Perman | |
| 4,131,455 A | 12/1978 | Edwards et al. | |
| 4,293,332 A | 10/1981 | Wang et al. | |
| 4,445,935 A | 5/1984 | Posey et al. | |
| 4,496,470 A | 1/1985 | Kapiloff et al. | |
| 4,539,041 A | 9/1985 | Figlarz et al. | |
| 5,089,097 A | 2/1992 | Goto et al. | |
| 5,389,122 A | 2/1995 | Glicksman | |
| 5,513,809 A * | 5/1996 | Perkel | B02C 19/186 241/175 |
| 5,715,387 A | 2/1998 | Barnstijn et al. | |
| 5,885,535 A | 3/1999 | Asano et al. | |
| 6,231,637 B1 | 5/2001 | Tayama et al. | |
| 6,277,290 B1 | 8/2001 | Ren et al. | |
| 6,332,908 B1 * | 12/2001 | Lee | B22F 1/0055 75/255 |
| 8,420,165 B2 | 4/2013 | Sato et al. | |
| 2004/0159185 A1 | 8/2004 | Shamblen et al. | |
| 2005/0183543 A1 | 8/2005 | Sasaki et al. | |
| 2006/0090599 A1 | 5/2006 | Goia et al. | |
| 2006/0159603 A1 | 7/2006 | Vanheusden et al. | |
| 2007/0056402 A1 | 3/2007 | Cho et al. | |
| 2009/0137706 A1 * | 5/2009 | Healy | C09B 67/0002 524/88 |
| 2009/0236567 A1 | 9/2009 | Ogi et al. | |
| 2009/0242231 A1 | 10/2009 | Miyagisima et al. | |
| 2010/0065789 A1 | 3/2010 | Sato | |
| 2010/0276647 A1 | 11/2010 | Irizarry | |
| 2012/0225126 A1 * | 9/2012 | Geckeler | B22F 1/0018 424/491 |
| 2013/0133484 A1 | 5/2013 | Hyeon et al. | |
| 2015/0211090 A1 * | 7/2015 | Johnson | B22F 1/0018 420/501 |

FOREIGN PATENT DOCUMENTS

| | | |
|---|---|---|
| CN | 1718330 A | 1/2006 |
| CN | 101065205 | 10/2007 |
| CN | 101774026 | 4/2011 |

(Continued)

OTHER PUBLICATIONS

Machine translation of CN-101774026 A, Jul. 14, 2010.*
Blanchard et al; "Final Report: Recovery of Silver From Cepod Anolyte Solutions"; Sep. 1994; Pacific Northwest Laboratory; 31 Pages.
CN201380051315.2 Search Report dated Dec. 24, 2015; 2 Pages.
DE112013004232.0 Office Action dated Nov. 11, 2015.
Debnath et al; Solid-State Synthesis of Silver Nanoparticles at Room Temperature: Poly (Vinylpyroolidone) as a Tool; Macromolecular Rapid Communications (2010), vol. 31, Issue 6, pp. 549-553.
Gonzalez et al; "Silver Recovery From Acidic Solutions by Formation of Nanoparticles and Submicroparticles of Ag on Microfiltration Membranes"; www.intechopen.com; Mass Transfer—Advanced Aspects; 23 Pages, (2011).

(Continued)

*Primary Examiner* — Steven J Bos
(74) *Attorney, Agent, or Firm* — Kevin M. Johnson

(57) ABSTRACT

Described herein are methods of making metallic or elemental silver in the solid state. These methods generally include a step of forming an at least substantially solvent-free solid state reaction mixture that includes a silver-containing compound and an organic acid, followed by heating the reaction mixture at a temperature and for a time effective to form metallic silver from a cationic silver species of the silver-containing compound. Also described herein are metallic or elemental silver produced by these methods.

16 Claims, 5 Drawing Sheets

(56) References Cited

FOREIGN PATENT DOCUMENTS

| CN | 102205421 A | | 10/2011 |
|---|---|---|---|
| CN | 102407342 B | | 6/2013 |
| DE | 4209180 | | 9/1993 |
| JP | 2003293049 A | | 10/2003 |
| JP | 2006348375 A | | 12/2006 |
| JP | 2009-144197 | * | 7/2009 |
| JP | 2009144197 A | | 7/2009 |
| JP | 2011080094 A | | 4/2011 |
| KR | 20110051690 | * | 5/2011 |
| RO | 116096 B | | 10/2000 |
| RU | 2170277 C2 | | 7/2001 |
| RU | 2258091 C1 | | 8/2005 |

OTHER PUBLICATIONS

International Search Report and Written Opinion of the International Searching Authority; PCT/US2013/057237; dated Nov. 22, 2013.
Perman; "Recovery of Silver From Silver Chloride Residues"; Talanta, vol. 26, pp. 603-607, (1979).
Sinha et al; "Preparation of Silver Powder Through Glycerol Process"; Bull. Mater. Sci. vol. 28, No. 3, Jun. 2005, pp. 213-217.
Tatykhanova et al; "Preparation of Gold and Silver Nanoparticles by Mechanical Activation"; Nanomaterials: Applications and Properties (NAP-2011) vol. 1, Part 1, pp. 165-168.
Yang et al; "Study of the Solid Reaction of Gold Compounds"; Chemical World, (3), Mar. 25, 1997; pp. 126-127.
Zhouxiang et al; "A Method to Recover Silver From Wast X-Ray Films With Spent Fixing Bath"; Hydrometallurgy, 92 (2008) 148-151.
International Search Report and Written Opinion of the International Searching Authority; PCT/US2013/057293; dated Nov. 22, 2013.
Chang Gun Lee, "Synthesis of High-purity Silver Colloids using a Thermal Decomposition method", Metals and Materials International, vol. 14, No. 2, Apr. 26, 2008, pp. 189-192, XP055086965.
Qin Y et al. "Size control over spherical silver nanoparticles by ascorbic acid reduction", Colloids and Surfaces. A Physicachemical and Engineering Aspects, Elsevier, Amsterdam, NL, vol. 372, No. 1-3, Dec. 2, 2010, pp. 172-176, XP027513419.
PCT/US2013/057237; The International Search report and the written opinion of the international searching authority, dated Nov. 22, 2013.
Dennis Steinigeweg et al, "Monodispersity and size control in the synthesis of 20-100 nm quasi-spherical silver nanoparticles by citrate and ascorbic acid reduction in glycerol-water mixtures", Chemical Communications, vol. 48, No. 69, Jul. 11, 2012, p. 8682, XP055087789.
Anna Zielinska, "Preparation of silver nanoparticles with controlled particle size", vol. 1, No. 2, Nov. 1, 2009, pp. 1560-1566, XP055086848.
PCT/US2013/057304; The International Search report and the written opinion of the international searching authority, dated Nov. 22, 2013.
Songping W, et al., "Preparation of ultrafine silver powder using ascorbic acid as reducing agent and its application in MLCI", Materials Chemistry and Physics, Elsevier, SA, Switzerland, Tiawan, Republic of China, vol. 89, No. 23, Feb. 15, 2005, pp. 423-427, XP027858575.
Guiquang Guo et al., "Preparation and dispersive mechanism of highly dispersive ultrafine silver powder", Applied Surface Science, vol. 256, No. 22, Sep. 1, 2010, pp. 6683-6687, XP055087130.
Aiqun, Yang, et al., Study on Solid Phase Reaction of Gold Compounds, Chemical World (3), 1997, pp. 125-127.
Alqadi et al., pH effect on the aggregation of silver nanoparticles synthesized by chemical reduction, Materials Science-Poland, 32(1), 2014, 107-111.
Bouis, Paul A. "Reagents, Buffers, and Indicators." Reagents, Buffers, and Indicators (2006): 95-106. ACS Publication. American Chemical Society.
Chen et al; "Key Factors in Chemical Reduction by Hydrazine for Recovery of Precious Metals"; Chemosphere, 49, 2002, 363-370.
Ethylene Glycol: Systemic Agent, Centers for Disease Control and Prevention, updated Nov. 20, 2014.
Lanying et al; "Research on New Process of Recovering High Purity Silver From Low Silver-Containing Waste"; Hunan Non-Ferrous Metal; vol. 10, No. 1; pp. 38-41 Feb. 1994.
Sondi et al., Preparation of highly concentrated stable dispersions of uniform silver nanoparticles, Journal of Colloid and Interface Science, 260 (2003) 75-81.
Perman; "Recovery of Silver From Silver Chloride. Residues"; Talanta, vol. 26, pp. 603-607, Dated Nov. 27, 1978.
English Translation of JP2015530024 Office Action dated Aug. 8, 2017, Japan Patent Office.

* cited by examiner

SOLVENT-FREE SYNTHESES OF SILVER PRODUCTS PRODUCED THEREBY

CROSS-REFERENCE TO RELATED APPLICATIONS

This Application claims the benefit of priority of U.S. Provisional Application Ser. No. 61/695,055 filed on 30 Aug. 2012 the content of which is relied upon and incorporated herein by reference in its entirety as if fully set forth below.

TECHNICAL FIELD

The present disclosure relates generally to the production of metallic (i.e., elemental) silver. More particularly, the various embodiments described herein relate to methods of making metallic silver that are at least substantially solvent-free, as well as to the metallic silver produced therefrom.

BACKGROUND

Silver is used extensively for industrial purposes owing to its exceptional properties (e.g., high electrical and thermal conductivity, malleability, ductility, and its resistance to corrosion). To illustrate, common uses for, or products incorporating, silver or silver compounds include photographic materials, electroplating, electrical conductors, dental alloys, solder and brazing alloys, paints, jewelry, coins, mirror production, antibacterial agents, and water purification.

The range of methods used to produce metallic silver include chemical, physical (atomization and milling), electrochemical, and thermal decomposition techniques. Each type of method generally produces particles with a characteristic morphology and purity that ultimately govern its functional properties. Among the various existing techniques, those based on chemical precipitation offer distinct advantages in terms of particle morphology, manufacturing cost, and scale-up efficiency for mass production.

Precipitation of metallic silver in solution generally involves a chemical reduction in which a dissolved silver salt species is treated with a reducing agent to generate metallic silver, which precipitates out from the solution. Though existing methods are relatively simple and incorporate quick reduction reactions, the reducing agents employed for such methods are frequently toxic and/or carcinogenic, and can cause safety and health problems when implemented in high volumes.

To address these concerns, methods that use alcohols or polyols have been developed. These methods generally involve the reduction of a silver salt species using a heated alcohol or polyol, which serves as both the reducing agent and solvent, in the presence of protecting ligands. A major drawback of these alcohol or polyol methods is that large quantities of organic solvents are used to dissolve the metal salts, and thus large quantities of chemical waste are generated.

There accordingly remains a need for improved technologies that can be used to produce metallic silver. It would be particularly advantageous if these methods were more simple, less chemical-intensive, and less expensive, while also being amenable to commercial-scale production of metallic silver. It is to the provision of such technologies that the present disclosure is directed.

BRIEF SUMMARY

Described herein are various methods of making metallic silver, as well as silver particles produced thereby.

One type of method of making metallic silver includes contacting a silver-containing compound with an organic acid to form an at least substantially solvent-free solid state reaction mixture, such that a concentration of the organic acid is equimolar to or in a stoichiometric excess of a concentration of a cationic silver species in the silver-containing compound. This type of method can also include a step of heating the at least substantially solvent-free solid state reaction mixture to a temperature that is less than a melting temperature of the organic acid for a time that is sufficient to produce a reaction product comprising metallic silver from the cationic silver species of the silver-containing compound.

In certain embodiments of this type of method, the silver-containing compound can include silver nitrate, silver nitrite, silver oxide, silver sulfate, silver phosphate, a silver halide, or a mixture thereof. Similarly, in certain overlapping or non-overlapping embodiments of this type of method, the organic acid can include lactic acid, citric acid, oxalic acid, ascorbic acid, fumaric acid, maleic acid, or a mixture thereof.

In some instances of this type of method, the contacting step can be performed in the presence of a catalyst, such that the at least substantially solvent-free solid state reaction mixture includes a catalytically effective amount of the catalyst. In some of these instances, the catalyst can include an alkali metal-containing compound. It is possible for an anionic species of the alkali metal-containing compound to be the same as an anionic species of the silver-containing compound.

Depending on the situation, the temperature of the heating step can be at least about 50 degrees Celsius. In one example, the temperature of the heating step can be about 100 degrees Celsius to about 150 degrees Celsius. Similarly, depending on the situation, the time of the heating can be about 10 minutes to about 24 hours. In one example, the time of the heating is about 15 minutes to about 5 hours.

In certain implementations, this type of method can include a step of recovering the metallic silver from the reaction product. In one such implementation, the recovering entails disposing the reaction product in a solvent, such that the metallic silver is dispersed in the solvent and a remaining portion of the reaction product is dissolved in the solvent, followed by separating the metallic silver from the solvent with the remaining portion of the reaction product dissolved therein.

When the recovering step is implemented, this type of method can further involve cooling the reaction product before the recovering step.

The metallic silver produced in some implementations of this type of method can be produced in a fractional yield of greater than 90 percent.

One type of metallic silver product can be produced in accordance with one or more of the embodiments of the type of method described directly above. The metallic silver product can have less than 20 parts per million of non-silver metals. In addition, or in the alternative, the metallic silver product can have an average particle size of less than or equal to about 1 micrometer.

Another type of method of making metallic silver includes contacting a silver-containing compound with an organic acid in a presence of a catalytically effective amount of a catalyst, which includes an alkali metal-containing compound, to form an at least substantially solvent-free solid state reaction mixture, such that a concentration of the organic acid is equimolar to or in a stoichiometric excess of a concentration of a cationic silver species in the silver-containing compound. This type of method can also include a step of heating the at least substantially solvent-free solid state reaction mixture to a temperature that is less than a melting temperature of the organic acid for about 10 minutes to about 24 hours to produce a reaction product that includes metallic silver from the cationic silver species of the silver-containing compound. This type of method can also include a step of cooling the reaction product. This type of method can also include a step of disposing the cooled reaction product in a solvent, such that the metallic silver is dispersed in the solvent and a remaining portion of the cooled reaction product is dissolved in the solvent, followed by separating the metallic silver from the solvent with the remaining portion of the reaction product dissolved therein.

In some implementations of this type of method, the silver-containing compound can be silver nitrate, the organic acid can be ascorbic acid, and the alkali metal-containing compound can be sodium nitrate.

Another type of metallic silver product can be produced in accordance with one or more of the embodiments of the type of method described directly above such that the metallic silver product includes less than 20 parts per million of non-silver metals and an average particle size of less than or equal to about 1 micrometer.

It is to be understood that both the foregoing brief summary and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

Figure 1:
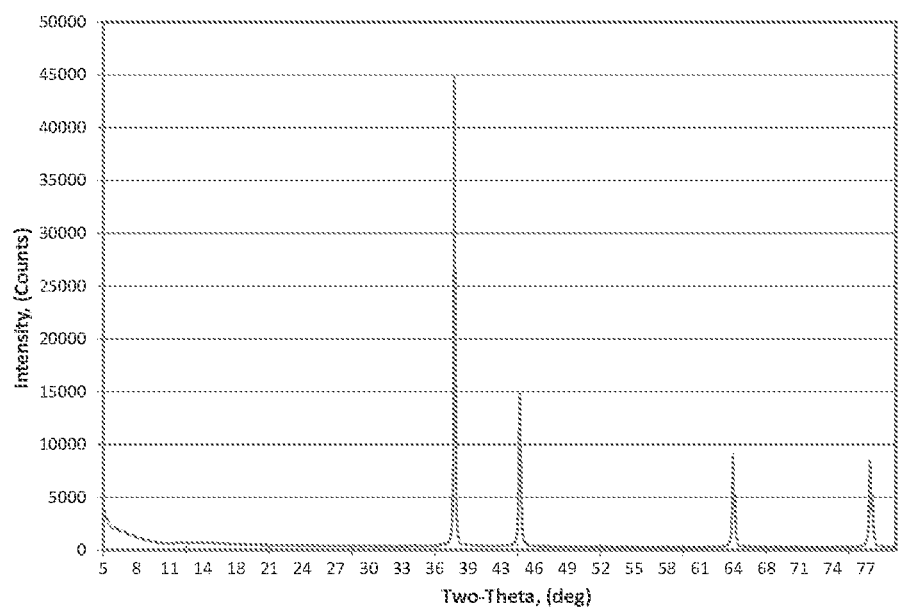
FIG. 1 is a powder X-ray diffraction pattern of the silver product produced in accordance with EXAMPLE 1.

These and other aspects, advantages, and salient features will become apparent from the following detailed description, the accompanying drawings, and the appended claims.

DETAILED DESCRIPTION

Referring now to the figures, wherein like reference numerals represent like parts throughout the several views, exemplary embodiments will be described in detail. Throughout this description, various components may be identified having specific values or parameters. These items, however, are provided as being exemplary of the present disclosure. Indeed, the exemplary embodiments do not limit the various aspects and concepts, as many comparable parameters, sizes, ranges, and/or values may be implemented. Similarly, the terms "first," "second," "primary," "secondary," "top," "bottom," "distal," "proximal," and the like, do not denote any order, quantity, or importance, but rather are used to distinguish one element from another.

Further, the terms "a," "an," and "the" do not denote a limitation of quantity, but rather denote the presence of "at least one" of the referenced item.

The methods described herein are based generally on the use of a solid organic acid to reduce the cationic silver species of a solid silver-containing compound to metallic (i.e., elemental) silver. These methods advantageously provide at least substantially solvent-free synthesis, mild reaction conditions, and significantly less chemical waste. As used herein, the terms "at least substantially solvent-free," "at least substantially free of a solvent," and other like variants are used interchangeably to mean that no solvent is intentionally added to, or used in, any raw material or the reaction mixture (which includes all of the raw materials) during any of the processing steps leading to the formation of the metallic silver. It is to be understood that a raw material or reaction mixture that is at least substantially free of a solvent may inadvertently contain small amounts of a solvent owing to contamination or it may contain no amount of solvent. Also, as used herein, the term "solvent" is intended to encompass liquids in which the raw materials or the reaction mixture are dispersed, suspended, or at least partially solvated.

These methods generally include a step of forming an at least substantially solvent-free solid state reaction mixture that includes a silver-containing compound and an organic acid, followed by heating the reaction mixture at a temperature and for a time effective to form a reaction product that includes metallic silver from a cationic silver species of the silver-containing compound. As stated above, the organic acid serves as a reducing agent by which the cationic silver species is reduced, during the heating step, to its metallic or elemental state.

In general, formation of the (solvent-free solid state) reaction mixture involves contacting a solid silver-containing compound with an organic acid. This can be achieved, for example, by combining or mixing particles of the silver-containing compound with particles of the organic acid, by disposing particles of the organic acid on a solid monolithic body of the silver-containing compound or vice-versa, or the like. In certain implementations of the methods, a solid monolithic body can be formed after the silver-containing compound and organic acid particles are combined or mixed.

The choice of silver-containing compound is not limited to a particular composition, as the methods described herein will yield metallic silver using any of a variety of material choices. For example, the silver-containing compound can be a binary compound (e.g., silver nitrate, silver nitrite, silver oxide, silver sulfate, silver phosphate, a silver halide, or the like), a ternary or multinary compound that includes a cationic silver species and a different cationic species, a mixture thereof, or a combination comprising one or more of the foregoing silver-containing compounds and a non-silver-containing compound.

Similarly, the choice of organic acid is not limited to a particular composition, as the methods described herein will yield metallic silver using any of a variety of material choices. The only requirement for the organic acid is that it is a solid both at room temperature and the temperatures to which the reaction mixture is exposed during the heating step. For example, the organic acid can be lactic acid, citric acid, oxalic acid, ascorbic acid, fumaric acid, maleic acid, or the like, or a mixture thereof.

In preparing the reaction mixture, there is no particular limitation on the ratio or relative amounts of silver-containing compound to organic acid in the reaction mixture. To ensure that all or substantially all of the cationic silver species in the silver-containing compound are reduced to metallic silver, however, the molar ratio of the organic acid to the cationic silver species in the silver-containing compound should be greater than or equal to about 1. That is, the concentration of the organic acid should be at least equimolar to, or in a stoichiometric excess of, the concentration of cationic silver species in the silver-containing compound.

In certain implementations of the methods described herein, an optional catalyst can be used to facilitate and expedite the reduction of the cationic silver species to metallic silver. When the optional catalyst is used, it is included in the reaction mixture. Thus, in these cases, formation of the reaction mixture involves contacting the solid silver-containing compound with the organic acid in the presence of the catalyst. This can be accomplished by using a particulate-based catalyst material that is combined or mixed with particles of both the silver-containing compound and organic acid, by disposing particles of the catalyst and one of the organic acid or silver-containing compound on a solid monolithic body of the other of the silver-containing compound or organic acid, by disposing particles of the catalyst on a solid monolithic body of the silver-containing compound and organic acid, or the like. In certain implementations, a solid monolithic body of all three components can be formed after particles of the three components are combined or mixed.

The optional catalyst material generally will include an alkali metal-containing compound that comprises a cationic alkali metal species. In exemplary embodiments, the alkali metal-containing compound and the silver-containing compound are the same type of compound (i.e., the anionic species of the alkali metal-containing compound is the same as the anionic species of the silver-containing compound). For example, in such embodiments, when the silver-containing compound is silver nitrate, then the alkali metal-containing compound is an alkali metal nitrate (e.g., sodium nitrate or potassium nitrate).

When used, the optional catalyst material will be present in at least a catalytically effective amount. As used herein, the term "catalytically effective amount" means that the amount of catalyst is sufficient, under the conditions that are employed, to expedite the chemical reduction of the cationic silver species to its elemental form relative to the same reaction without the catalyst material. This amount, which can be expressed as a molar ratio of the cationic alkali metal species in the alkali metal-containing compound to the cationic silver species in the silver-containing compound, can be as low as 0.1. There is no upper limit to the amount of the catalyst, as the organic acid selectively and preferentially reduces the cationic silver species over the cationic alkali metal species.

Once the reaction mixture comprising the silver-containing compound and the organic acid (and, optionally, the catalyst) is formed, it can be subjected to the heating step. In general, this involves heating the reaction mixture to an elevated temperature for a time that is sufficient to produce a reaction product that includes metallic silver from the cationic silver species. While the heating step can take place under different atmospheric conditions (e.g. in argon, nitrogen, or the like), in most implementations, it is generally conducted in air.

The reduction reaction, as induced by the heating step (and, optionally, the catalyst), is an exothermic reaction. Thus, to avoid potential decomposition of the organic acid, the temperature to which the reaction mixture is heated during the heating step will be less than or equal to about the melting temperature of the organic acid. In general, the temperature of the heating step will be about 50 degrees Celsius (° C.) to about the melting temperature of the organic acid. In most implementations, however, the temperature of the heating step will be about 100° C. to about 150° C.

The duration of the heating step will generally depend on the temperature of the heating step and whether the optional catalyst is implemented in the reaction mixture. The upper limit of this duration will be that which is necessary to chemically reduce the desired amount of cationic silver species to metallic silver. In general, the duration of the heating step will be about 10 minutes to about 24 hours. In most implementations, however, the duration of the heating step will be about 15 minutes to about 5 hours.

Those skilled in the art to which this disclosure pertains will recognize that the use of the optional catalyst can result in lower temperatures and/or shorter durations being employed. The exact time and temperature of a given heating step can readily be determined by those skilled in the art to which this disclosure pertains without undue experimentation.

Once the heating step is completed, the metallic silver can be recovered or isolated from the reaction product. The recovery or isolation step can involve the use of a solvent in which metallic silver particles are dispersed and the remaining portion of the reaction product (i.e., any unreacted material and/or reaction byproducts) is dissolved, followed by separating (e.g., by filtering, decanting, or the like) the metallic silver from the solvent with the remaining portion of the reaction product dissolved therein. Suitable solvents for this step will be those in which metallic silver is not soluble and with which metallic silver does not react. These solvents include water, simple alcohols (e.g., methanol, ethanol, propanol, and the like), or the like. Once the metallic silver is isolated, the solvent optionally can be treated to recover the components of the reaction product (unreacted material and/or reaction byproducts) dissolved therein.

In scenarios where the reaction product is a solid monolithic body or includes a plurality of large agglomerated particles, it can be broken up before disposing it in the solvent (e.g., by grinding in a mortar and pestle, mechanical attrition, or the like), and/or while in the solvent (e.g., by mechanical stirring, with an ultrasonic transducer, or the like).

While the recovery step can be performed just after the heating step, in most implementations of the methods described herein, the recovery step will be performed after the reaction product is cooled to a lower temperature (e.g., to room temperature).

The above described methods, in their various implementations, can be highly efficient. That is, fractional yields for silver in the reaction product of greater than 90 percent (%) are readily achievable. In many implementations, particularly those in which a stoichiometric excess of the organic acid is used, a fractional yield of 100% can be obtained.

Additionally, the metallic silver product that is produced using the above described methods can be highly pure. That is, the recovered or isolated metallic silver will generally have less than 20 ppm of non-silver metals as quantified, for example, by techniques such as inductively coupled plasma-mass spectrometry (ICP-MS). In many implementations, particularly those in which the reaction temperatures and times are longer, and in which the recovery step is more thoroughly performed, the recovered metallic silver will have less than 10 ppm of non-silver metals.

In addition to high purity, the metallic silver exhibits high crystallinity (e.g., as exhibited by powder X-ray diffraction (PXRD)).

The average particle size (which is considered to be the average longest cross-sectional dimension of the particles) of the metallic silver generally is less than or equal to about 1 micrometer. As used herein, the term "longest cross-sectional dimension" refers to the longest cross-sectional dimension of a particle. Thus, to clarify, when a particle is circular, the longest cross-sectional dimension is its diameter; when a particle is oval-shaped, the longest cross-sectional dimension is the longest diameter of the oval; and when a particle is irregularly-shaped, the longest cross-sectional dimension is the line between the two farthest opposing points on the perimeter of the particle. In many implementations, the average particle size of the metallic silver is about 50 nanometers (nm) to about 500 nm.

In one environmentally friendly application of the methods described herein, the source of the silver-containing compound is obtained from an industrial process. Specifically, the silver-containing compound can be a "spent" or "exhausted" silver ion exchange bath, as is used in providing glass and other material surfaces with antimicrobial capabilities. The initial silver ion exchange bath (i.e., before being used to impart the antimicrobial properties to the glass or other materials) can be formed from molten silver nitrate. In certain situations, the initial silver ion exchange bath can be formed from molten silver nitrate and sodium nitrate. Once implemented, the ion exchange bath becomes contaminated with non-silver ionic species (i.e., those ions that are exchanged out from the glass or other material in order to permit silver ions to exchange in). Eventually, the ion exchange baths become too contaminated to be useful for efficient silver ion exchange. Under these circumstances, the silver ion exchange bath is termed "spent" or "exhausted."

In such an application of the methods described herein, the spent silver ion exchange bath, which is a solid monolithic body (when below its melting temperature), can be ground into a powder. An equimolar (or greater) amount of organic acid, in powder form, can be mixed with the spent silver ion exchange bath powder. If the initial silver ion exchange bath did not contain sodium nitrate, then sodium nitrate powder can be added as a catalyst. At this point, the reaction mixture has been formed, and is ready for the heating step.

The reaction mixture thus formed can be heated in air in an open furnace to a temperature of about 100° C. to about 140° C. for a period of about 20 minutes to about 90 minutes. After the heating step, the reaction product can be cooled to room temperature. Once cooled, the reaction product can be disposed in water and/or ethanol to separate the metallic silver from the remainder of the reaction product. Under these conditions, the metallic silver will be dispersed within the water and/or ethanol solution, and the remainder of the reaction product will dissolve therein. To facilitate separation of the metallic silver product from the remainder of the reaction product, the solution can be stirred vigorously. At this point, the metallic silver can be recovered from the solution by filtration. Under these conditions, the fractional yield of silver can be greater than about 97%.

In these applications of the methods described herein, the metallic silver product can be highly crystalline and can have less than 5 ppm of non-silver metals. In addition, the average particle size of this metallic silver product can be about 120 nm to about 400 nm.

The various embodiments of the present disclosure are further illustrated by the following non-limiting examples.

EXAMPLES

Example 1

In this example, metallic silver powder was fabricated using silver nitrate as the silver-containing compound, ascorbic acid as the organic acid, and sodium nitrate as the optional alkali metal-containing catalyst.

About 6.0 grams (g) of silver nitrate, about 6.22 g of ascorbic acid, and about 0.6 g of sodium nitrate were thoroughly mixed in a porcelain crucible. This corresponded to an approximately equimolar ratio of cationic silver to ascorbic acid. The solid mixture was placed in an air vented furnace, then heated to, and held at, about 140° C. for about 1 hour. After about one hour, the powder mixture was cooled to room temperature. The grey colored product of the reaction was washed in ethanol while stirred for about 5 minutes. Next, deionized (DI) water was added to the ethanol-containing mixture and stirred vigorously until the solution clarified, which took about 10 minutes. The precipitate was separated from the solution by decantation and washed several times with DI water, followed by drying at about 110° C. for about 2 hours. The dried precipitate was characterized using powder X-ray diffraction (PXRD) and inductively coupled plasma-mass spectrometry (ICP-MS) to determine the crystallinity and purity, respectively, of the product.

FIG. 1 is a PXRD pattern of the dried precipitate product produced in accordance with this example. The pattern shown in FIG. 1 is indicative of a highly-crystalline metallic silver sample. ICP-MS revealed that, other than silver, the sample contained less than 1 part per million (ppm) of sodium, aluminum, calcium, and copper; less than 5 ppm potassium; and less than 2 ppm of nickel. Thus, high purity metallic silver was able to be produced in this example.

Example 2

In this example, metallic silver powder was fabricated using silver nitrate as the silver-containing compound, ascorbic acid as the organic acid, and sodium nitrate as the optional alkali metal-containing catalyst.

About 8.0 g of silver nitrate, about 9.95 g of ascorbic acid, and about 0.8 g of sodium nitrate were thoroughly mixed in a porcelain crucible. This corresponded to an amount of ascorbic acid in excess of the stoichiometric amount relative to cationic silver. The solid mixture was placed in an air vented furnace, then heated to, and held at, about 140° C. for about 1 hour. After about 1 hour, the powder mixture was cooled to room temperature. The grey colored product of the reaction was washed in ethanol while stirred for about 5 minutes. Next, DI water was added to the ethanol-containing mixture and stirred vigorously until the solution clarified, which took about 10 minutes. The precipitate was separated from the solution by decantation and washed several times with DI water, followed by drying at about 110° C. for about 2 hours. The dried precipitate was characterized using PXRD and ICP-MS to determine the crystallinity and purity, respectively, of the product.

Figure 2:
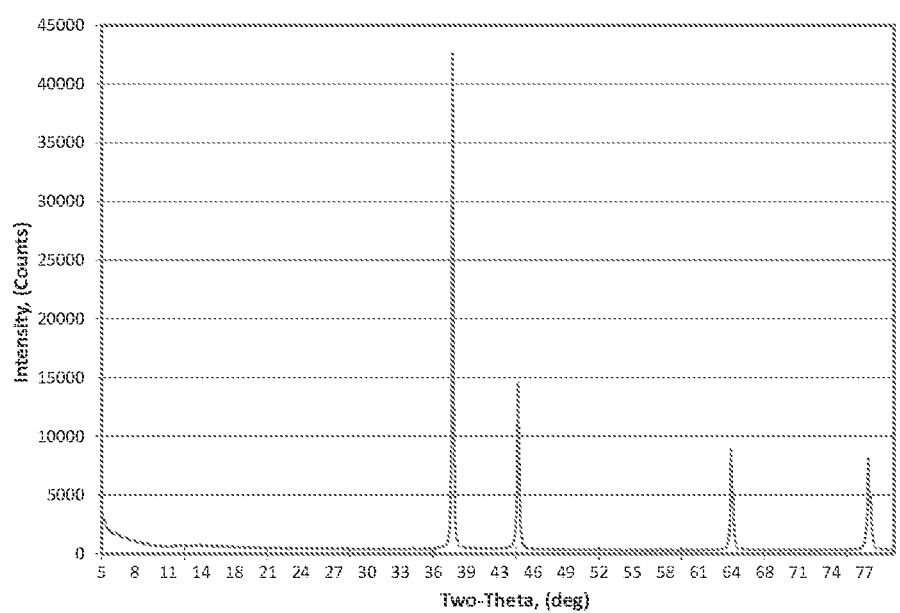
FIG. 2 is a powder X-ray diffraction pattern of the silver product produced in accordance with EXAMPLE 2.

FIG. 2 is a PXRD pattern of the dried precipitate product produced in accordance with this example. The pattern shown in FIG. 2 is indicative of a highly-crystalline metallic silver sample. ICP-MS revealed that, other than silver, the sample contained less than 1 ppm of sodium, aluminum, calcium, and copper; less than 5 ppm potassium; and less than 2 ppm of nickel. Thus, high purity metallic silver was able to be produced in this example.

Example 3

In this example, metallic silver powder was fabricated using silver nitrate as the silver-containing compound, ascorbic acid as the organic acid, and sodium nitrate as the optional alkali metal-containing catalyst.

The exact procedure described above in EXAMPLE 2 was carried out, with the exception that the powder reaction mixture was held at about 130° C. for about 3 hours during the heating step.

Figure 3:
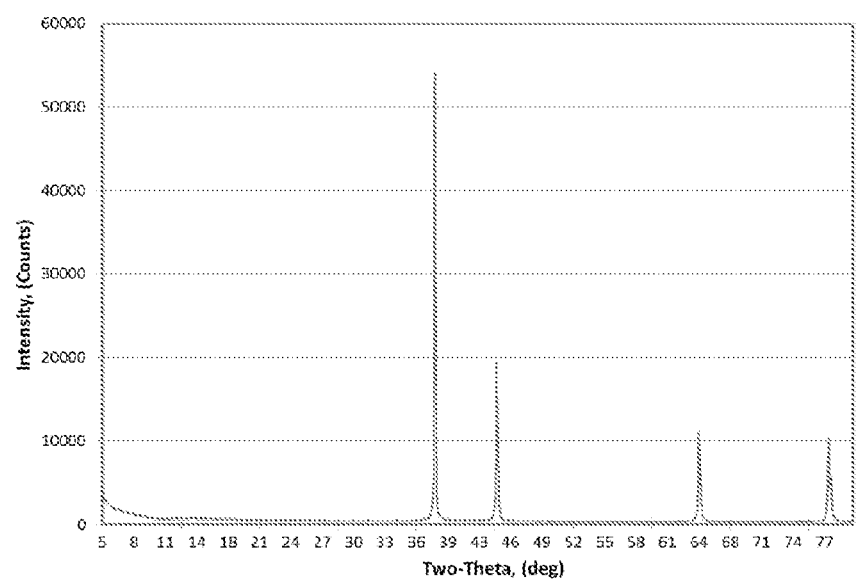
FIG. 3 is a powder X-ray diffraction pattern of the silver product produced in accordance with EXAMPLE 3.

FIG. 3 is a PXRD pattern of the dried precipitate product produced in accordance with this example. The pattern shown in FIG. 3 is indicative of a highly-crystalline metallic silver sample. ICP-MS revealed that, other than silver, the sample contained less than 1 ppm of sodium, aluminum, calcium, and copper; less than 5 ppm potassium; and less than 2 ppm of nickel. Thus, high purity metallic silver was able to be produced in this example.

Example 4

In this example, metallic silver powder was fabricated using silver nitrate as the silver-containing compound, ascorbic acid as the organic acid, and sodium nitrate as the optional alkali metal-containing catalyst.

About 8.0 g of silver nitrate, about 9.94 g of ascorbic acid, and about 1.6 g of sodium nitrate were thoroughly mixed in a porcelain crucible. This corresponded to an amount of ascorbic acid in excess of the stoichiometric amount relative to cationic silver, and a doubling of the amount of the alkali metal-containing catalyst relative to the reaction mixture of EXAMPLE 2. The solid mixture was placed in an air vented furnace, then heated to, and held at, about 140° C. for about 1 hour. After about 1 hour, the powder mixture was cooled to room temperature. The grey colored product of the reaction was washed in ethanol while stirred for about 5 minutes. Next, DI water was added to the ethanol-containing mixture and stirred vigorously until the solution clarified, which took about 10 minutes. The precipitate was separated from the solution by decantation and washed several times with DI water, followed by drying at about 110° C. for about 2 hours. The dried precipitate was characterized using PXRD and ICP-MS to determine the crystallinity and purity, respectively, of the product.

Figure 4:
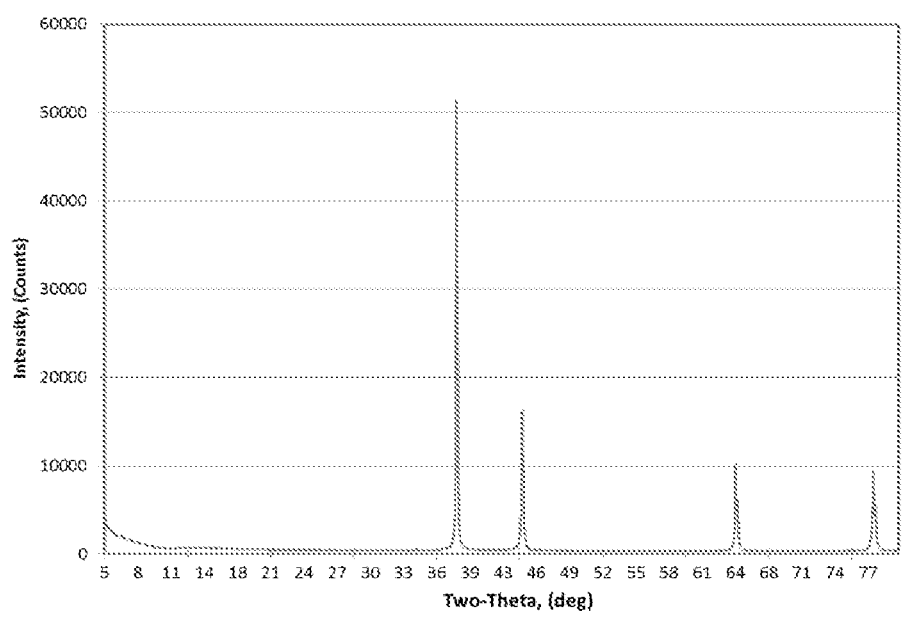
FIG. 4 is a powder X-ray diffraction pattern of the silver product produced in accordance with EXAMPLE 4.

FIG. 4 is a PXRD pattern of the dried precipitate product produced in accordance with this example. The pattern shown in FIG. 4 is indicative of a highly-crystalline metallic silver sample. ICP-MS revealed that, other than silver, the sample contained less than 1 ppm of sodium, aluminum, calcium, and copper; less than 5 ppm potassium; and less than 2 ppm of nickel. Thus, high purity metallic silver was able to be produced in this example.

Example 5

In this example, metallic silver powder was fabricated using silver nitrate as the silver-containing compound, ascorbic acid as the organic acid, and sodium nitrate as the optional alkali metal-containing catalyst. In contrast to EXAMPLES 1-4 above, however, where the silver nitrate and sodium nitrate sources were commercially purchased powders, the source of these materials in this example was a spent solid silver ion exchange bath that had an initial composition of about 50 weight percent (wt %) silver nitrate and about 50 wt % sodium nitrate.

First, the solid sample was crushed and ground into powder. Next, about 12 g of the powdered sample and about 8.0 g of ascorbic acid were thoroughly mixed in a glass beaker. The mixture was placed in an air vented oven at about 100° C. and held for about 30 minutes. After about 30 minutes, the powder mixture was cooled to room temperature. The grey colored product of the reaction was washed in ethanol while stirred for about 5 minutes. Next, DI water was added to the ethanol-containing mixture and stirred vigorously until the solution clarified, which took about 10 minutes. The precipitate was separated from the solution by decantation and washed several times with DI water, followed by drying at about 110° C. for about 2 hours. The dried precipitate was characterized using PXRD and ICP-MS to determine the crystallinity and purity, respectively, of the product.

Figure 5:
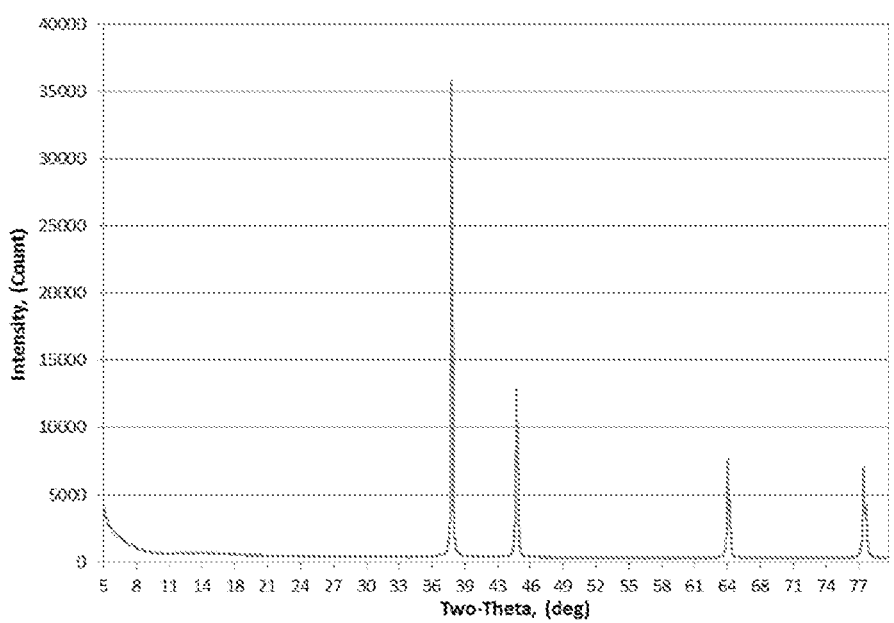
FIG. 5 is a powder X-ray diffraction pattern of the silver product produced in accordance with EXAMPLE 5.

FIG. 5 is a PXRD pattern of the dried precipitate product produced in accordance with this example. The pattern shown in FIG. 5 is indicative of a highly-crystalline metallic silver sample. ICP-MS revealed that, other than silver, the sample contained less than 1 ppm of sodium, aluminum, calcium, and copper; less than 5 ppm potassium; and less than 2 ppm of nickel. Thus, high purity metallic silver was able to be produced in this example.

As can be seen from the above description and examples, the methods described herein are useful, especially in the area of powder metallurgy, as a result of their simplicity, economic character, and ability to be industrially scaled-up.

While the embodiments disclosed herein have been set forth for the purpose of illustration, the foregoing description should not be deemed to be a limitation on the scope of the disclosure or the appended claims. Accordingly, various modifications, adaptations, and alternatives may occur to one skilled in the art without departing from the spirit and scope of the present disclosure or the appended claims.

What is claimed is:

1. A method for making metallic silver, the method comprising:
    contacting a silver-containing compound with an organic acid to form an at least substantially solvent-free solid state reaction mixture, wherein the concentration of the organic acid is equimolar to or in a stoichiometric excess of the concentration of the cationic silver species in the silver-containing compound, the contacting is performed in a presence of an alkali metal-containing compound; and
    heating the at least substantially solvent-free solid state reaction mixture to a temperature less than the melting temperature of the organic acid for a time effective to produce a reaction product comprising metallic silver from the cationic silver species of the silver-containing compound.

2. The method of claim 1, wherein the silver-containing compound comprises silver nitrate, silver nitrite, silver oxide, silver sulfate, silver phosphate, a silver halide, or a mixture thereof.

3. The method of claim 1, wherein the organic acid comprises lactic acid, citric acid, oxalic acid, ascorbic acid, fumaric acid, maleic acid, or a mixture thereof.

4. The method of claim 1, wherein the alkali metal-containing compound comprises a sodium-containing compound, a potassium-containing compound or a mixture thereof.

5. The method of claim 4, wherein the sodium-containing compound is sodium nitrate, and the potassium containing compound is potassium nitrate.

6. The method of claim 4, wherein an anionic species of the alkali metal-containing compound is the same as an anionic species of the silver-containing compound.

7. The method of claim 1, wherein the temperature of the heating is at least about 50 degrees Celsius.

8. The method of claim 1, wherein the temperature of the heating is about 100 degrees Celsius to about 150 degrees Celsius.

9. The method of claim 1, wherein the time of the heating is about 10 minutes to about 24 hours.

10. The method of claim 1, wherein the time of the heating is about 15 minutes to about 5 hours.

11. The method of claim 1, further comprising recovering the metallic silver from the reaction product.

12. The method of claim 11, wherein the recovering comprises:
    disposing the reaction product in a solvent; and
    separating the metallic silver from the solvent.

13. The method of claim 11, further comprising cooling the reaction product before recovering the metallic silver from the reaction product.

14. The method of claim 1, wherein the metallic silver is produced in a fractional yield of greater than 90 percent.

15. A method for making metallic silver, the method comprising:
    contacting a silver-containing compound with an organic acid in the presence of a catalytically effective amount of a catalyst comprising an alkali metal-containing compound to form an at least substantially solvent-free solid state reaction mixture, wherein the concentration of the organic acid is equimolar to or in a stoichiometric excess of the concentration of the cationic silver species in the silver-containing compound;
    heating the at least substantially solvent-free solid state reaction mixture to a temperature less than the melting temperature of the organic acid for about 10 minutes to about 24 hours to produce a reaction product comprising metallic silver from the cationic silver species of the silver-containing compound;
    cooling the reaction product;
    disposing the cooled reaction product in a solvent, wherein the metallic silver is dispersed in the solvent; and
    separating the metallic silver from the solvent.

16. The method of claim 15, wherein the silver-containing compound is silver nitrate, the organic acid is ascorbic acid, and the alkali metal-containing compound is sodium nitrate.

* * * * *

UNITED STATES PATENT AND TRADEMARK OFFICE
CERTIFICATE OF CORRECTION

PATENT NO. : 9,982,322 B2  
APPLICATION NO. : 14/423870  
DATED : May 29, 2018  
INVENTOR(S) : Benedict Yorke Johnson et al.

Page 1 of 1

It is certified that error appears in the above-identified patent and that said Letters Patent is hereby corrected as shown below:

On the Title Page

In Column 1, item (54), Title, Line 1, delete "SILVER" and insert -- SILVER AND SILVER --, therefor.

In Column 2, item (56), other publications, Line 8, delete "(Vinylpyroolidone)" and insert -- (Vinylpyrrolidone) --, therefor.

On page 2, Column 1, item (56), other publications, Line 23, delete "Physicachemical" and insert -- Physicochemical --, therefor.

On page 2, Column 2, item (56), other publications, Line 18, delete "Tiawan," and insert -- Taiwan, --, therefor.

In the Specification

In Column 1, Line 1, delete "SILVER" and insert -- SILVER AND SILVER --, therefor.

Signed and Sealed this  
Ninth Day of June, 2020

Andrei Iancu  
*Director of the United States Patent and Trademark Office*